March 20, 1973 L. N. SCHIFF ET AL 3,721,955

DISABLED VEHICLE SIGNALLING SYSTEM

Filed July 15, 1971 2 Sheets-Sheet 1

SEQUENCE 1: DISTRESSED SIGNAL TRANSMISSION

SEQUENCE 2: RECEIPT & STORAGE OF DESTRESSED SIGNAL

SEQUENCE 3: STORAGE & CARRYING OF DISTRESSED SIGNAL

SEQUENCE 4: INTERROGATION, REPLY & ERASE

SEQUENCE 5: INTERROGATION & NO REPLY

INVENTOR.
**Harold Staras &
Leonard N. Schiff**

BY *Robert L. Troike*

ATTORNEY

March 20, 1973    L. N. SCHIFF ET AL    3,721,955

DISABLED VEHICLE SIGNALLING SYSTEM

Filed July 15, 1971      2 Sheets-Sheet 2

INVENTORS
Harold Staras &
Leonard N. Schiff

BY *Robert L. Troike*

ATTORNEY

United States Patent Office 3,721,955
Patented Mar. 20, 1973

3,721,955
DISABLED VEHICLE SIGNALLING SYSTEM
Leonard Norman Schiff, Trenton, and Harold Staras, Princeton, N.J., assignors to RCA Corporation
Filed July 15, 1971, Ser. No. 162,857
Int. Cl. G08g 1/09
U.S. Cl. 340—33
4 Claims

ABSTRACT OF THE DISCLOSURE

A system is described which will allow disabled motorists to signal for help directly from the disabled vehicle by the use of suitably equipped passing vehicles on limited access highways. The suitably equipped vehicles receive the distress message from a disabled vehicle and store that message until the vehicle reaches an interrogator unit located, for example, near an exit of the highway. The interrogator unit acts both as a transmitter and a receiver. When a passing vehicle bearing a distress message receives the interrogation signal, it transmits the distress message to the receiver portion of the interrogation unit for appropriate further action and is itself reset to the original state so that the process can start all over again. This signalling system can also accommodate an acknowledgement feature so that the disabled motorist will know that his request for assistance has entered the system.

Figure 1:
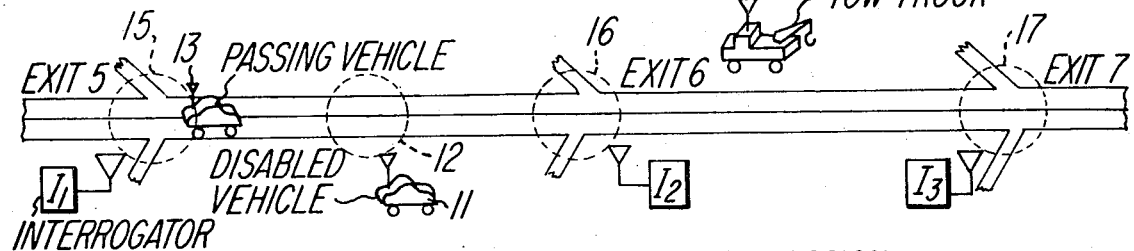
Figure 1:
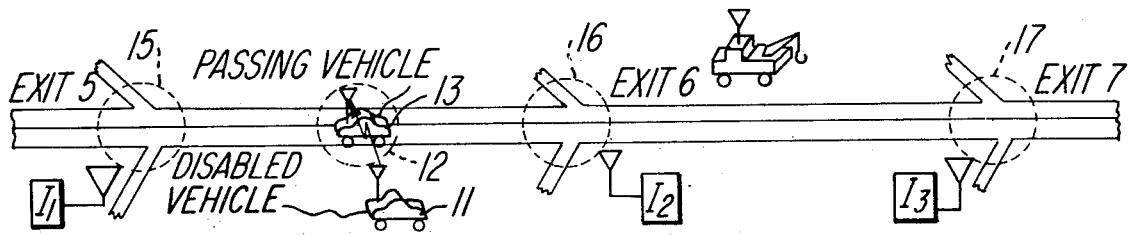
Figure 1:
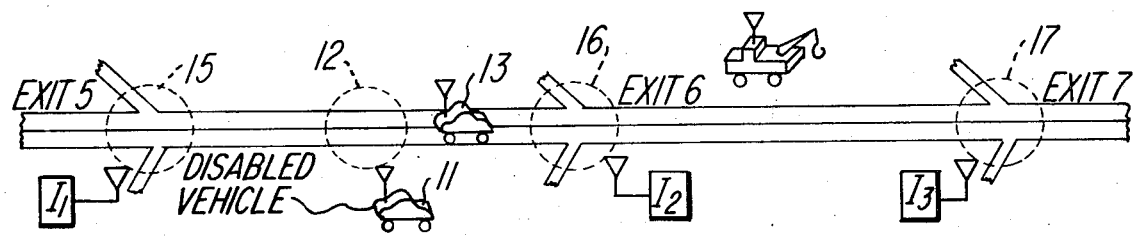
Figure 1:
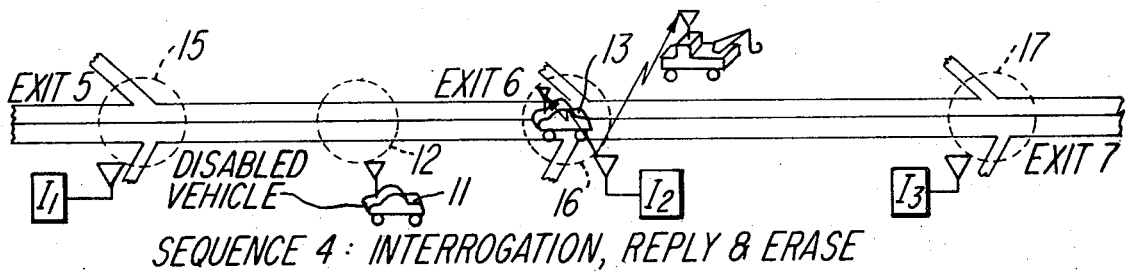
Figure 1:
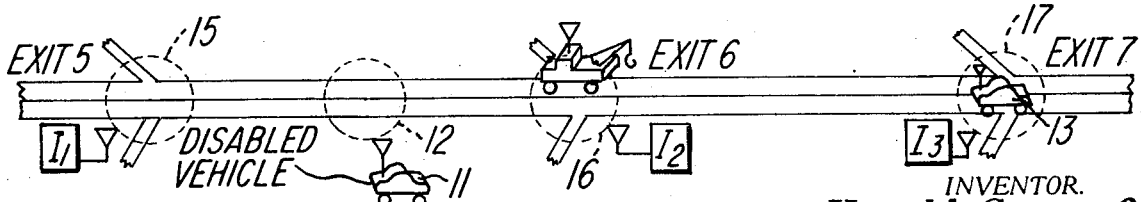

This invention relates to a disabled signalling system, and more particularly, to a disabled automobile signalling system wherein the passing traffic acts as an automatic carrier of a call for assistance, yet the passing vehicles need not stop and the disabled motorist need not leave the car for help.

A motorist often has a great deal of difficulty in getting help when he becomes disabled or needs help either for himself or his car on one of our high speed limited access highways. This problem becomes particularly acute at night when few passing motorists are willing to stop to aid him and the police patrols are relatively infrequent. Often someone may see a motorist in difficulty when passing, but may not wish to aid that person because of his or her unqualification for doing so or for fear of jeopardizing himself in doing so.

A further difficulty for a passing motorist who may tell a toll collector, for example, someone is disabled, is that he does not know what type of assistance is required, whether it be police, ambulance or just a few gallons of gasoline. Some highway systems have installed special telephones every mile or so to be used by the distressed motorists. The difficulty in this arrangement is that the motorist must walk to this telephone if he is able to do so. This is not particularly safe, especially at night or in inclement weather.

Direct beacon systems from the disabled car to an aid station are not only costly but require a substantial power drain on the automobile battery source. If the relatively unused frequency spectrum above, say 10 gHz, is used the power source required to transmit over ten miles may become an impractical value. Furthermore, the distressed motorist is not always able to explain his or her location.

Briefly, the above difficulties are overcome by the herein described disabled vehicle signalling system. In this system, interrogator units are placed along a highway. Care should be taken to make sure that one unit is located at every highway exit. Each interrogator unit includes a transmitter and a receiver. The transmitter sends an interrogation message and the receiver is responsive to a replied signal from a vehicle unit. Each vehicle unit contains a transmitter portion and a receiver portion. Upon the selection of a proper distress message at the disabled vehicle's transmitter portion, this proper distress message is transmitted from the distressed vehicle. A passing vehicle equipped with the same or similar vehicle transmit-receive system, in response to the transmitted distress signal, receives and stores the transmitted signal from the disabled vehicle and carries it to the location of the interrogation unit. When the passing vehicle holding the stored distress messages passes the interrogator unit it, in response to the received interrogator signal, transmits the message to the interrogator unit and then returns to the receive mode to receive any new distress message.

Figure 3:
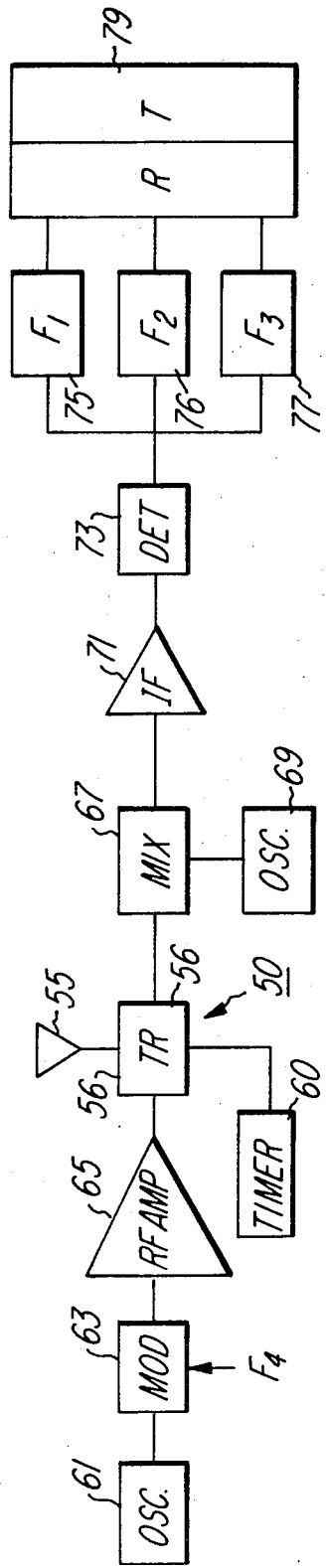
Figure 2:
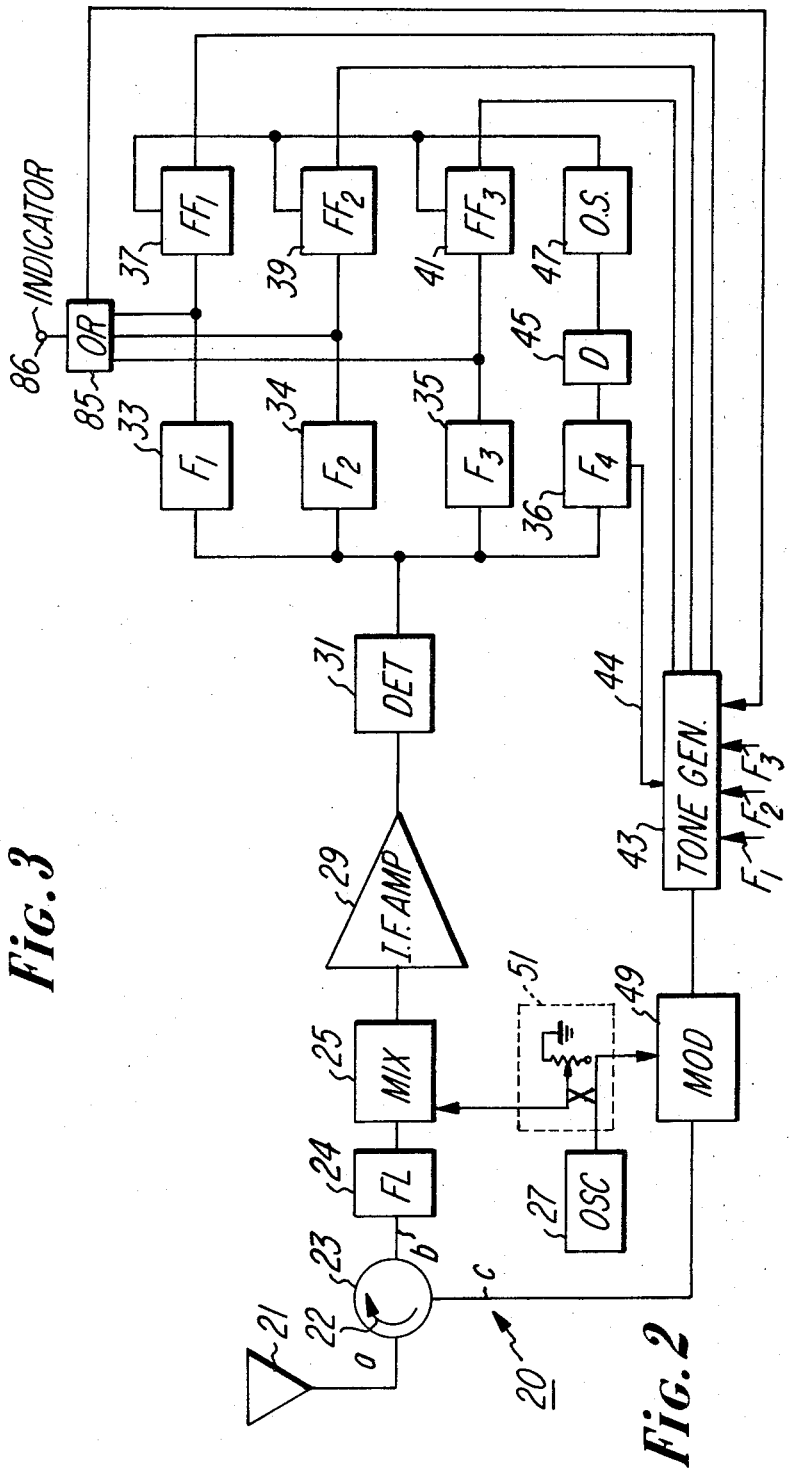

A further description follows in conjunction with the following drawings wherein:

FIG. 1 is a diagram of the five sequences associated with a disabled vehicle signalling system in accordance with the present invention, FIG. 2 is a block diagram of the vehicle system, and FIG. 3 is a block diagram of the interrogator system.

Referring to FIG. 1, there is illustrated by five sequences how the disabled vehicle signalling system operates. Referring to Sequence 1, there is illustrated a limited access highway 10, having therealong Exits 5, 6 and 7. Near Exit 5 there is placed a first interrogator $I_1$, near Exit 6 there is located a second interrogator $I_2$, and near Exit 7 there is located an interrogator $I_3$. These interrogators each contain a transmitter and a receiver. The power levels of the interrogator are rather low so as to provide the relatively small coverage area with an antenna indicated by the dashed lines 15, 16 and 17 about the Exits 5, 6 and 7, respectively. The transmit message of each of the interrogators is that which is sufficient to identify itself as an interrogator.

Located between Exits 5 and 6, for example, is disabled vehicle 11. This disabled vehicle 11 has a relatively low-powered transmitter-receiver system. The transmitter for the vehicle system is relatively low powered for a coverage area with an antenna as illustrated by the dashed line 12. This coverage area is sufficient to cross the side strip on the other side of the highway. The transmit mode of the vehicle system may be selected by pressing a selection of buttons to send tones which indicate preselected messages such as: "Send a service truck," "Send police," or "Send medical help."

As view in Sequence 1, a passing vehicle 13 coming from Exit 5 toward Exit 6 is shown. This passing vehicle 13 has a similar vehicle transmit-receive system as in the disabled vehicle, but is operating in the normally receive mode. As we see in Sequence 1, the passing vehicle 13 is approaching the disabled vehicle 11.

In Sequence 2, the passing vehicle 13 is within the short range radio link coverage area 12 of the disabled vehicle 11. The distress tone message which means, for example, "Send a service truck," is received and stored in the passing vehicle 13.

In Sequence 3, the passing vehicle 13 stores the distress message, for example, "Send a service truck." The passing vehicle 13 carries this signal to the next interrogator unit $I_2$ at Exit 6.

At Exit 6, as indicated in Sequence 4, the interrogator unit $I_2$ interrogates the passing vehicle 13 when the passing vehicle is in the coverage area 16. When the passing vehicle 13 is within the coverage area 16 of the interrogator unit $I_2$, the transmitted signals from the interrogator unit, plus the fact that there is a stored message from the disabled vehicle in the vehicle 13, causes the system in the passing vehicle 13 to transmit the stored message to the interrogator unit $I_2$. For example, the tone indicating "Send a service truck" is sent to interrogation unit $I_2$. The received signal at the interrogator unit $I_2$ allows a distress message to be sent to the appropriate service. For example, a tow truck or service truck is notified to send help to the area between Exits 5 and 6. The stored information in the passing vehicle 13 is by the above operation automatically erased.

As indicated by Sequence 5, when the passing vehicle 13 reaches Exit 7 and is in the coverage area 17, the interrogation signal from interrogator $I_3$ is not acted upon by the passing vehicle since the distress message has been erased from storage. Consequently, no false triggering of the interrogator $I_3$ occurs.

The disabled vehicle signalling system herein described can also be designed to include an acknowledgement feature. The acknowledgment would notify the distressed motorist after signalling for assistance that his distress call has entered the system. One way of accomplishing this acknowledged function is to have all passing vehicles that pick up the distress message respond with a simple burst signal. After five or ten such responses, the distress call can be shut off and a display light lit in the disabled vehicle's system to indicate that a reasonable number of passing vehicles have received the call for assistance and that at least one of them should, with very high probability, be able to notify the next interrogation unit that assistance is requested. Specific circuit configurations for performing the acknowledgement function are known in the art.

Referring to FIG. 2, there is illustrated a block diagram of a vehicle system 20. The vehicle system 20 has an antenna 21 coupled to a transmit-receive switch 23. The receiver only is normally energized. This switch 23 may be made up of a hybrid or, as illustrated, a circulator such as that described by Hershenov in Pat. No. 3,456,213.

The arrow 22 indicates the direction of coupling. Signals from the antenna 21 at terminal $a$ are coupled nonreciprocally to terminal $b$ and signals at terminal $c$ are coupled nonreciprocally to terminal $a$. The signals at antenna 21 are coupled through circulator 23 and bandpass filter 24 to the receiver-mixed 25. The local oscillator 27 signal is combined through directional coupler 51 with the incoming RF signal to form an IF frequency signal at the output of the mixer 25. The IF output from mixer 25 is coupled through an IF amplifier 29 to an audio detector 31. The detected audio output from detector 31 is applied to four bandpass filters 33, 34, 35 and 36 which are selected to pass different audio frequencies associated with a predetermined distress message.

Coupled to the respective bandpass filters 33, 34 and 35 are flip-flop storage units 37, 39 and 41. These storage units, in response to an output from its associated bandpass filter change from a logic "0" to a logic "1" state.

Coupled to the output of respective flip-flop storage units 37, 39 and 41 is a tone generator 43. The presence of a logic "1" state at one of the flip-flops' storage units selects a corresponding tone at tone generator 43, so that when the generator 43 is energized, the selected tone is applied to modulator 49. The output of bandpass filter 36 is coupled directly to tone generator 43. The filter 36 is associated with an interrogator audio tone. Upon the detected presence of the interrogator audio tone at the bandpass filter 36, the tone generator 43 is energized over lead 44. The output of the bandpass filter 36 is also coupled through delay 45 to a one shot pulse generator 47. The output of the pulse generator 47 provides reset pulses to the flip-flop stages 37, 39 and 41 to reset them to the logic "0" state.

At the tone generator 43 are provided signals of frequencies $F_1$, $F_2$ and $F_3$. Frequencies $F_1$, $F_2$, and $F_3$ correspond to the frequency selectivity of the bandpass filters 33, 34 and 35, respectively. In response to the output of flip-flop stages 37, 39 and 41, appropriate frequencies $F_1$, $F_2$ and $F_3$ are applied to modulator 49. The audio signals $F_1$, $F_2$ and $F_3$ are combined with the carrier frequency provided by local oscillator 27. The carrier frequency at oscillator 27 is coupled through directional coupler 51 to modulator 49. The modulated output is coupled through the circulator 23 to the antenna 21.

Referring to FIG. 3, there is illustrated a block diagram of an interrogator system 50. At the transmitter portion of the interrogator system 50, there is provided a carrier frequency oscillator 61 which frequency is close enough to oscillator 27 to provide a desirable IF output. The carrier frequency is combined at modulator 63 with an interrogator audio tone at frequency $F_4$. The modulated carrier output from mixer 63 may be amplified at RF amplifier 65 and coupled through a transmit-receive switch 56 to antenna 55.

In the receive mode, the RF signals at the interrogator system 50 received at the antenna 55 are applied through the transmit-receive switch 56 to the mixer 67. At mixer 67 the incoming RF signals are combined with a local frequency supplied by oscillator 69 which frequency is sufficient to provide an IF frequency signal. The IF signal output from mixer 67 is amplified at IF amplifier 71 and applied to an audio detector 73. At the output of the audio detector 73 there is provided three bandpass filters 75, 76 and 77 which are similar to the bandpass filters 33, 34 and 35 in the vehicle 20. The bandpass filter 75, 76 or 77 couples the appropriate distress tone to the transmitter-receiver 79. The transmitter-receiver 79 then relays the message to the appropriate rescue service such as a service truck. Switching between transmit and receive modes is done by means of a timer 60 which alternately supplies a bias pulse, for example, to switch 56 to change from transmit mode to receive mode and back to transmit mode.

In the operation of the system described in the above block diagrams, the disabled vehicle 11 selects the appropriate tone in generator 43 of FIG. 2. The appropriate tone is that which corresponds to an ambulance, a service truck or the police, for example. The appropriate tone, say $F_1$, for example, is associated with the message "Send for service truck" is combined at modulator 49 with the RF carrier frequency supplied by local oscillator 27 which may be, for example, at 10 gHz. (gigahertz). Operating carrier frequencies on the order of 10 to 20 gHz. or such high microwave frquencies are desirable since there is little other use at these frequencies. New microwave solid state sources such as transferred electron oscillators TEO's or avalanche diode oscillators or amplifiers lower the cost and size of devices operating at these frequencies. The modulated signal is applied through the circulator 23 of the vehicle system 20 to the antenna 21.

Referring to FIG. 2 again, and considering this as the passing vehicle 13, the received message from the disabled vehicle 11 is coupled through the circulator 23 and filter 24 and applied to the mixer 25. The received distress signal is combined with a local oscillator frequency near the received carrier frequency of the disabled vehicle to provide at the output an IF frequency signal which is amplified by IF amplifier 29 and applied to the audio detector 31. The detected audio output at frequency $F_1$ is coupled through the bandpass filter 33 to the flip-flop 37 to set this flip-flop to a logic "1" state. Since the other frequencies were not set by the distressed vehicle, both flip-flops 39 and 41 remain in the logic "0" state.

Upon the passing vehicle 13 passing near the interrogator system 50, the interrogation signals are coupled at the antenna 21 of the vehicle and applied through the circulator 23 and filter 24 to the mixer 25. The local oscillator frequency from the local oscillator 27 is combined at mixer 25 with the received RF signal resulting in an IF output from the mixer 25. The IF output is amplified at IF amplifier 29. This IF signal is coupled to the audio detector 31 which detects the $F_4$ signal frequency which is coupled through bandpass filter 36. This signal output from the filter 36 is applied as bias to the tone generator 43 to energize the tone generator. Upon the energization of the tone generator 43, that tone $F_1$, $F_2$ or $F_3$ associated with a logic "1" output from flip-flop stages 37, 39 and 41 enables the tone generator 43 to couple the corresponding frequency to the modulator 49. In the above example, frequency $F_1$ is coupled to modulator 49. The RF carrier signal at oscillator 27 is coupled through coupler 51 and modulated with the $F_1$ signal frequency. The modulated output is then coupled through the circulator 23 and radiated out of the antenna 21 to the interrogator system 50. After a predetermined delay sufficient to allow the vehicle to pass the coverage area 16 of the interrogator $I_2$, the flip-flop stages 37, 39 and 41 are reset to logic "0" state. This is accomplished by delay 45 and one-shot multivibrator 47.

At the interrogator 50, the received reply from the passing vehicle 13 is coupled through antenna 55 and transmit-receive switch 56 to the mixer 67. The received RF signal from the passing vehicle 13 is mixed with the local oscillator signal from oscillator 69 to provide an IF frequency that is applied at IF amplifier 71. The IF amplifier output containing the disabled vehicle's message is applied to the audio detector 73 and, as in the example, the audio tone detected is the $F_1$ audio frequency tone meaning, "Send a service truck." This is passed through bandpass filter 75 and applied to the receiver-transmitter 79. Upon reception of the selected tone that means, "Send a service truck," a service truck is alerted and sent to aid the disabled vehicle 11.

The acknowledgment feature to notify the distressed motorist that his distress call has entered the system could be provided by the passing vehicle 13 energizing its tone generator 43 on momentarily upon the occurrence of an output from one of the bandpass filters 33, 34 or 35. The distressed vehicle 11 could have an acknowledgment indicator responsive to the outputs of either of its filters 33, 34 or 35. This circuit is shown in simplified form in FIG. 2 by the OR gate 85 coupled between the outputs of the filters 33, 34, 35, an indicator terminal 86 and the tone generator 43.

What is claimed is:

1. A disabled vehicle signalling system for use along limited access roadways where there are vehicles passing by the disabled vehicle in the passing vehicle's normal route between accesses comprising, in combination:

a series of interrogators including a transmitter and receiver spaced along said roadway, said transmitter transmitting interrogation messages over the immediate area of the roadway adjacent to the interrogator, a first vehicle system in said disabled vehicle for transmitting a distress message over the immediate area of the roadway adjacent to the disabled vehicle, a second vehicle system in said passing vehicle responsive to the distress message transmitted from the disabled vehicle when said passing vehicle is in said immediate area of said roadway adjacent said disabled vehicle for receiving and storing said distress message, said second vehicle system with said stored distress message being carried by the passing vehicle to an area covered by one of said interrogators, said passing vehicle system, when in the area covered by one of said interrogators, being responsive to said transmitted interrogation message to transmit to said interrogator receiver the stored distress message in the second vehicle system initiated by the first vehicle system in the disabled vehicle.

2. The combination claimed in claim 1 wherein an interrogator is placed at each of said accesses of said roadway.

3. The combination claimed in claim 2 wherein said interrogator includes means for switching between the states of transmission of said interrogation message and reception.

4. The combination claimed in claim 2 wherein said second vehicle system in said passing vehicle includes a delayed erasing means, said second vehicle system responsive to said interrogation message for erasing said stored message following a predetermined delay sufficient to allow receipt of and response to said interrogation mes- References Cited

UNITED STATES PATENTS

| 3,644,883 | 2/1972 | Borman et al. | 340—23 |
| 3,633,158 | 1/1972 | Heibel | 340—34 |
| 3,492,581 | 1/1970 | Wisniewski | 340—32 |
| 3,441,858 | 4/1969 | Graham | 340—33 |
| 3,090,042 | 5/1963 | Kleist et al. | 340—31 R |
| 2,896,072 | 7/1959 | Bachelet et al. | 340—22 |

KATHLEEN H. CLAFFY, Primary Examiner

R. P. MYERS, Assistant Examiner

U.S. Cl. X.R.

340—32